United States Patent
Karagioules et al.

(10) Patent No.: US 12,301,931 B2
(45) Date of Patent: May 13, 2025

(54) OPTIMIZATION OF BITRATE ADAPTATION AND PREFETCHING FOR SHORT-FORM VIDEO

(71) Applicant: AT&T Intellectual Property I, L.P., Atlanta, GA (US)

(72) Inventors: Theodore Karagioules, Jersey City, NJ (US); Emir Halepovic, Somerset, NJ (US); Subhabrata Sen, Edison, NJ (US); Vijay Gopalakrishnan, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 88 days.

(21) Appl. No.: 18/300,373

(22) Filed: Apr. 13, 2023

(65) Prior Publication Data

US 2024/0348868 A1 Oct. 17, 2024

(51) Int. Cl.
*H04N 21/44* (2011.01)
*H04N 21/262* (2011.01)
*H04N 21/647* (2011.01)

(52) U.S. Cl.
CPC . *H04N 21/44004* (2013.01); *H04N 21/26258* (2013.01); *H04N 21/64738* (2013.01)

(58) Field of Classification Search
CPC ....... H04N 21/44004; H04N 21/26258; H04N 21/64738
See application file for complete search history.

(56) References Cited

U.S. PATENT DOCUMENTS

| | | | |
|---|---|---|---|
| 2015/0032854 A1* | 1/2015 | Wang | H04N 21/26258 709/219 |
| 2016/0112732 A1* | 4/2016 | Li | H04N 21/2385 725/116 |
| 2018/0041787 A1* | 2/2018 | Panje | H04N 21/26258 |
| 2020/0021634 A1* | 1/2020 | Li | H04N 21/44004 |
| 2022/0417305 A1* | 12/2022 | Chandrashekar | H04N 21/26258 |

OTHER PUBLICATIONS

Karagioules, Theodore et al., "Bitrate Adaptation and Prefetching for Short-Form Video," U.S. Appl. No. 18/300,369, filed Apr. 13, 2023, 43 pages.

* cited by examiner

*Primary Examiner* — Jefferey F Harold
*Assistant Examiner* — Alexander Boyd

(57) ABSTRACT

A method includes acquiring a playlist identifying a plurality of video files to be played back during a video streaming session on an endpoint device, obtaining, from an operator of a communications network over which the video files are to be downloaded, a maximum throughput for the video streaming session, selecting a subsequent video file that is scheduled in the playlist for playback after a playback of a currently playing video file, wherein the subsequent video file includes a plurality of chunks, selecting, based on the maximum throughput and for each of the chunks, a variant, such that a plurality of variants is selected in which each variant corresponds to one chunk of the plurality of chunks, wherein the variants are selected to maximize a utility function that is constrained by the maximum throughput, and downloading the plurality of variants to a local buffer of the endpoint device.

20 Claims, 4 Drawing Sheets

OPTIMIZATION OF BITRATE ADAPTATION AND PREFETCHING FOR SHORT-FORM VIDEO

The present disclosure relates generally to video streaming, and relates more particularly to devices, non-transitory computer-readable media, and methods for optimizing end-system prefetching and bitrate adaptation for short-form video streaming.

BACKGROUND

An increasing percentage of the total volume of video traffic streamed over the Internet can be attributed to short-form video, i.e., video content whose duration tends to run for a few tens of seconds or a few minutes (e.g., often less than one minute, or less than three minutes in other instances) as opposed to tens of minutes to several hours that is typical of conventional video on demand (VoD) content. Short-form video is often user-generated (i.e., produced through amateur production channels as opposed to professional production channels), and viewers tend to consume multiple short-form video sequentially in a single video streaming session.

SUMMARY

In one example, the present disclosure describes a device, computer-readable medium, and method for optimizing end-system prefetching and bitrate adaptation for short-form video streaming. For instance, in one example, a method performed by a processing system including at least one processor includes acquiring a playlist identifying a plurality of video files and an order in which the plurality of video files is to be played back during a video streaming session on an endpoint device, obtaining, from an operator of a communications network over which the plurality of video files is to be downloaded to the endpoint device, a maximum throughput for the video streaming session, selecting, from among the plurality of video files, a subsequent video file, wherein the subsequent video file is scheduled in the playlist for playback after a playback of a currently playing video file of the plurality of video files ends, and wherein the subsequent video file includes a second plurality of chunks, selecting, based on the maximum throughput and for each chunk of the second plurality of chunks, a variant, such that a second plurality of variants is selected in which each variant of the second plurality of variants corresponds to one chunk of the second plurality of chunks, wherein the selecting the second plurality of variants maximizes a utility function for the video streaming session, and wherein the utility function is constrained by the maximum throughput, and downloading the second plurality of variants to a local buffer of the endpoint device.

In another example, a non-transitory computer-readable medium stores instructions which, when executed by a processing system including at least one processor, cause the processing system to perform operations. The operations include acquiring a playlist identifying a plurality of video files and an order in which the plurality of video files is to be played back during a video streaming session on an endpoint device, obtaining, from an operator of a communications network over which the plurality of video files is to be downloaded to the endpoint device, a maximum throughput for the video streaming session, selecting, from among the plurality of video files, a subsequent video file, wherein the subsequent video file is scheduled in the playlist for playback after a playback of a currently playing video file of the plurality of video files ends, and wherein the subsequent video file includes a second plurality of chunks, selecting, based on the maximum throughput and for each chunk of the second plurality of chunks, a variant, such that a second plurality of variants is selected in which each variant of the second plurality of variants corresponds to one chunk of the second plurality of chunks, wherein the selecting the second plurality of variants maximizes a utility function for the video streaming session, and wherein the utility function is constrained by the maximum throughput, and downloading the second plurality of variants to a local buffer of the endpoint device.

In another example, a system includes a processing system including at least one processor and a non-transitory computer-readable medium storing instructions which, when executed by the processing system, cause the processing system to perform operations. The operations include acquiring a playlist identifying a plurality of video files and an order in which the plurality of video files is to be played back during a video streaming session on an endpoint device, obtaining, from an operator of a communications network over which the plurality of video files is to be downloaded to the endpoint device, a maximum throughput for the video streaming session, selecting, from among the plurality of video files, a subsequent video file, wherein the subsequent video file is scheduled in the playlist for playback after a playback of a currently playing video file of the plurality of video files ends, and wherein the subsequent video file includes a second plurality of chunks, selecting, based on the maximum throughput and for each chunk of the second plurality of chunks, a variant, such that a second plurality of variants is selected in which each variant of the second plurality of variants corresponds to one chunk of the second plurality of chunks, wherein the selecting the second plurality of variants maximizes a utility function for the video streaming session, and wherein the utility function is constrained by the maximum throughput, and downloading the second plurality of variants to a local buffer of the endpoint device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
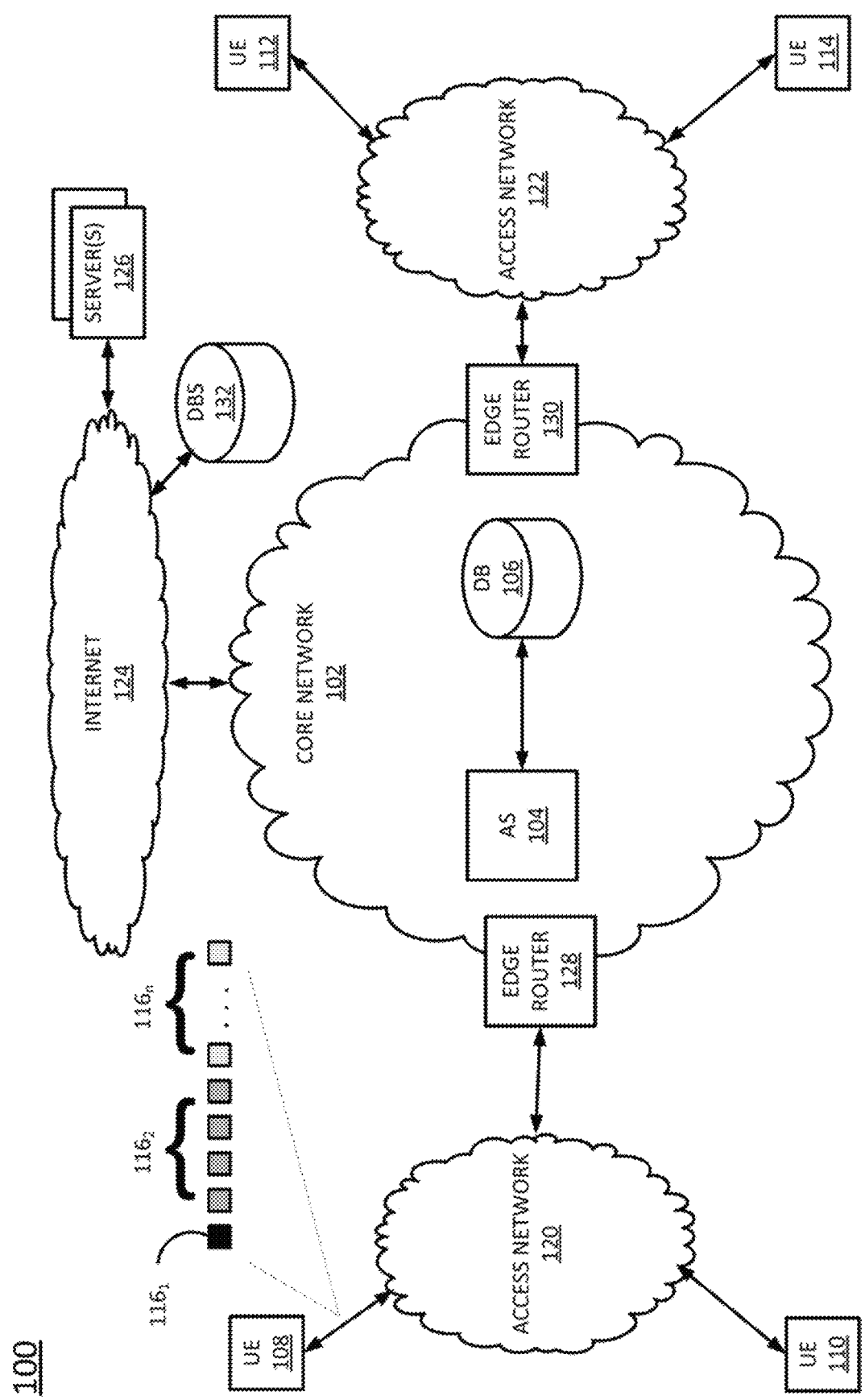
FIG. 1 illustrates an example system in which examples of the present disclosure for streaming short-form video may operate.

In one example, the present disclosure provides a system, method, and non-transitory computer readable medium for optimizing end-system prefetching and bitrate adaptation for short-form video streaming. As discussed above, an increasing percentage of the total volume of video traffic streamed over the Internet can be attributed to short-form video, i.e., video content whose duration tends to run in the order of seconds or a few minutes (e.g., for a few tens of seconds, and often less than one minute, or less than three minutes in other instances) as opposed to tens of minutes to several hours that is typical of conventional video on demand (VoD) content. Short-form video is often user-generated (i.e., produced through amateur production channels as opposed to professional production channels), and viewers tend to consume multiple short-form videos sequentially in a single video streaming session.

Since viewers of short-form video content typically view multiple videos sequentially, many applications that provide short-form video streaming employ a prefetching feature that, during playback of a current video, proactively downloads videos to be played back after playback of the current video concludes. Prefetching minimizes the delay between playback of individual videos. However, prefetching also increases the instantaneous volume of network traffic. Moreover, a viewer may elect to skip viewing of a video that has already been prefetched. Thus, providers of short-form video streaming applications must balance the desire to provide good quality of experience against the need to make efficient use of network resources and minimize waste.

Telecommunications network providers have employed a range of techniques in order to manage the volume of network traffic generated by video streaming services, including restricting video quality level to balance quality of experience and network utilization goals. However, because the quality of experience requirements for short-form video differ from those for VoD or live streaming, the network management approaches that have been used to manage VoD and live streaming traffic may not always provide optimal results when applied to short-form video traffic. For instance, because short-form video streaming often employs prefetching, as discussed above, there are periods of the video streaming session during which the throughput requirements may be a multiple of the session's average throughput. Thus, traffic management techniques that impose a hard upper throughput limit might force a client device running a short-form video streaming application to adapt the multiple concurrent video streams through which video are being prefetched to lower bitrates to avoid exceeding the upper throughput limit. This, in turn, can negatively affect quality of experience.

As such, the ability to correctly distinguish between a long-form video and a short-form video in a video streaming session is critical. Current techniques for distinguishing between long-form and short-form video, however, place the burden of distinguishing on the operator of the communications network. This may make it more difficult for the operator of the communications network to improve network services and optimize network planning and management. Moreover, when the video is streamed via encrypted files, as is becoming more prevalent, the operator of the communications network has less visibility into information (e.g., number of object requests, sizes and types of objects, identities of servers/content providers, etc.) that would enable correct identification session-level information.

Examples of the present disclosure rely on the endpoints of a video streaming session to distinguish between different types of video traffic, so that respective streams of the video traffic can be handled in the manners most appropriate to the types of traffic (e.g., short-form or long-form) contained in the respective streams. More particularly, examples of the present disclosure allow an operator of a communications network to communicate a maximum value for a streaming parameter to an endpoint (e.g., a server or a client) of a short-form video streaming service. The endpoint may then utilize this maximum value to make decisions concerning the streaming of a currently playing video file and/or the prefetching of video files to be played subsequent to the currently playing video file. Thus, in essence, by communicating the maximum value, the operator of the communications network enables the endpoint to perform bitrate self-regulation. In one example, the streaming parameter may include one or more of: a maximum allowed video resolution requested per video file, a maximum allowed declared encoding bitrate requested per video file, a maximum allowed average throughput that the endpoint is allowed to use, a maximum allowed instantaneous throughput that the endpoint is allowed to use, a maximum allowed file size per individual video chunk, a maximum allowed file size per video file (i.e., entire file), a maximum allowed data size per individual endpoint request, a maximum total data consumption per video session, and/or a maximum total data consumption over a period of time during a video session.

Examples of the present disclosure therefore constrain the aggregate bitrate utilized by a short-form video streaming client application over the duration of a short-form video streaming session, both to download the video content currently being played and to prefetch video content to be played later, up to an upper bound (e.g., maximum throughput or other streaming parameters). The upper bound may be predetermined or may vary dynamically with network conditions or other variations.

The disclosed approach may be especially helpful in cellular networks, or any network in which the network resources may be limited. An operator of the network could simplify traffic management processes by sharing the disclosed bitrate self-regulation techniques with content providers (e.g., services that support short-form video streaming). For instance, the operator of the network could negotiate service-level agreements with the content providers pertaining to the maximum value of the streaming parameter available to the content providers' users. Thus, the operator of the network may focus on monitoring compliance with the service-level agreements without having to implement complex network management systems. The content providers may be provided with the flexibility to choose the optimal mechanisms to deliver short-form video content to users, while users may enjoy better quality of experience.

Although examples of the present disclosure are discussed within the context of video streaming, it will be appreciated that the techniques disclosed herein may apply equally to the streaming of other types of media, including music/audio, video games, and other media. These and other aspects of the present disclosure are discussed in further detail with reference to FIGS. 1-4, below.

To further aid in understanding the present disclosure, FIG. 1 illustrates an example system 100 in which examples of the present disclosure for streaming short-form video may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a wearable device (e.g., a smart watch or fitness tracker), an augmented reality (AR), virtual reality (VR) headset, customer premises equipment (e.g., gateway devices), a bank or cluster of such devices, and the like. In one example, any one of the user endpoint devices 108, 110, 112, and 114 may be operable to run an application that may communicate with the server(s) 126 or other application servers in the system 100, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet software applications that may exchange data with the user endpoint devices 108, 110, 112, and 114 over the Internet 124. Thus, some of the servers 126 and DBs 132 may host applications including video conferencing applications, extended reality (e.g., virtual reality, augmented reality, mixed reality, and the like) applications, immersive gaming applications, and the like. In one example, at least some of the servers 126 and DBs 132 host applications that stream short-form video to the user endpoint devices 108, 110, 112, and 114.

In accordance with the present disclosure, the AS 104 may be configured to provide one or more operations or functions in connection with examples of the present disclosure for providing maximum values for video streaming parameters for short-form video streaming sessions to the endpoints of those short-form video streaming sessions (e.g., to user endpoint devices 108, 110, 112, and 114 and/or servers 126), as described herein. As discussed above, the video streaming parameter may comprise at least one of: a maximum allowed video resolution of the subsequent video file, a maximum allowed encoding bitrate of the subsequent video file, a maximum allowed average throughput over a duration of the video streaming session, a maximum allowed instantaneous throughput for the video streaming session, a maximum allowed file size per chunk of the second plurality of chunks, a maximum allowed file size of the subsequent video file, a maximum allowed data size per request for the endpoint device, a maximum allowed total data consumption for the video streaming session, or a maximum allowed total data consumption over a period of time during the video streaming session.

The maximum value of the streaming parameter for a given short-form video streaming session may be determined by the AS 104 based on any one or more of a number of factors, including a quality of experience guaranteed by the provider of the short-form video streaming service, a subscription tier or level associated with a user of a user endpoint device to which the short-form video files are streamed, current network conditions (e.g., traffic volume, latency, etc.), and/or other factors.

Figure 4:
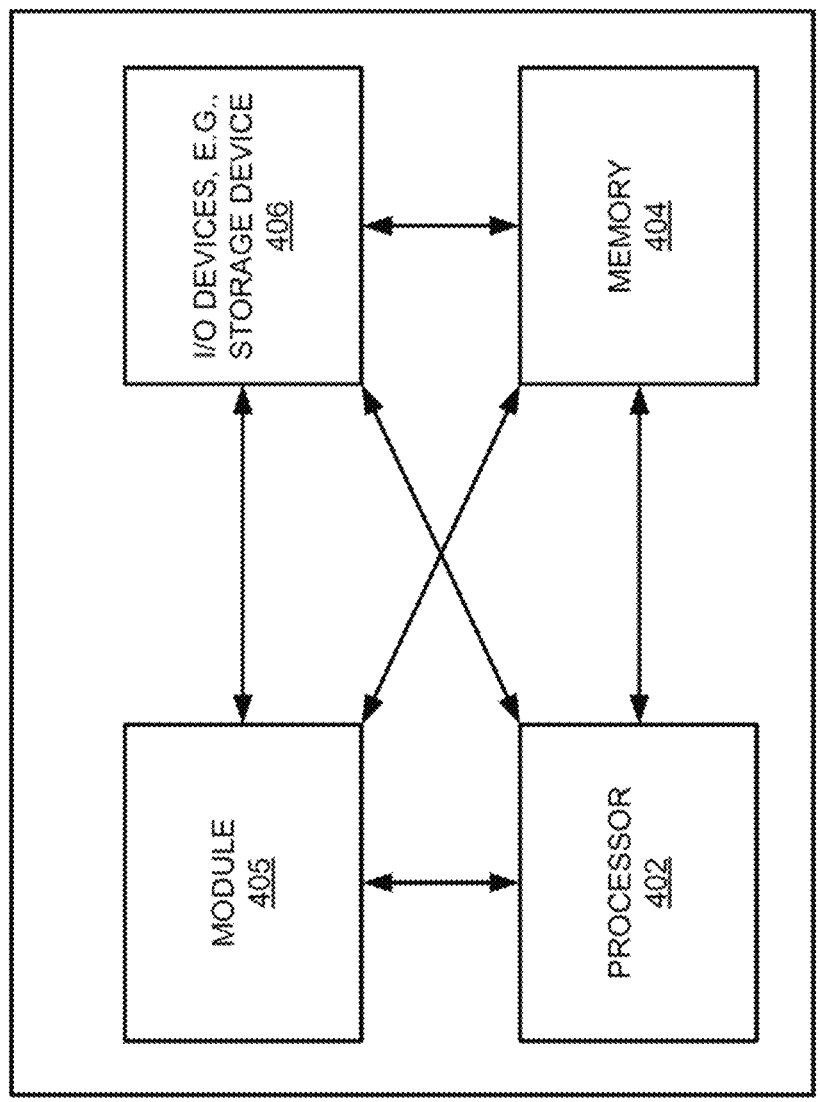
FIG. 4 depicts a high-level block diagram of a computing device specifically programmed to perform the functions described herein.

The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the DB 106 may store one or more predefined maximum values for the streaming parameter, where the predefined maximum values may be associated with, for instance, different subscription tiers of a short-form video streaming service, different service-level agreements guaranteeing specific quality of experience or specific performance metrics, or other parameters that may be associated with a fixed maximum streaming parameter value. In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for communicating maximum values for streaming parameters to endpoints of a short-form video streaming session, such as user endpoint devices and application servers, as described herein.

In one example, any of the user endpoint devices 108, 110, 112, or 114 (or any applications running thereon) may initiate a video streaming session to stream short form video from one or more servers, such as servers 126. In this case, a video streaming session may involve the streaming of a plurality of individual video files, where the plurality of video files may be played back one-by-one, sequentially according to a predefined order. The identities of the individual video files, and the order in which the individual video files are to be played, may be defined by a playlist (where the playlist may be defined manually by a user of a user endpoint device 108, 110, 112, or 114 or may be defined automatically by one of the servers 126). During the video streaming session, the user endpoint device 108, 110, 112, or 114 may download the individual video files from the server 126 and play the individual video files back for the user. Download and playback of video files may both occur simultaneously.

For instance, as is known in the art of streaming media, a single video file may be segmented into a plurality of "chunks," where each chunk contains a subset of the video frames making up the video file. For instance, each chunk may contain a few seconds of the video file, where the complete video file may be of a much longer duration. The chunks of a video file may have a consistent duration (or data size) or may have varying durations (or data sizes). Thus, when the video streaming session begins, the user endpoint device 108, 110, 112, or 114 may initially download at least a first plurality of chunks of a first video file in the playlist to a local buffer. As the first plurality of chunks of the first video file are being played back (and evicted from the buffer after playback), the user endpoint 108, 110, 112, or 114 may simultaneously download a next plurality of chunks of the first video file to the local buffer. This minimizes stalls in the playback of the first video file.

Additionally, the user endpoint device 108, 110, 112, or 114 may, simultaneously with the playback of one or more chunks of the first video file, also download one or more chunks of one or more subsequent video files in the playlist to the local buffer (where the subsequent video files comprise video files that are to be played after playback of the first video file concludes). This technique is referred to as "prefetching," because chunks of video files are downloaded before those chunks are needed for playback. This is illustrated conceptually in FIG. 1, where a plurality of video files $116_1$-$116_n$ (hereinafter individually referred to as a "video file 116" or collectively referred to as "video files 116") are simultaneously being downloaded by the user endpoint device 108. In this example, the black chunks comprise chunks of a first video file $116_1$, the dark gray chunks comprise chunks of a second video file $116_2$, and the light gray chunks comprise chunks of an nth video file $116_n$.

Periodically during the video streaming session (i.e., while the user endpoint device 108, 110, 112, or 114 is playing back and/or prefetching of video files), the AS 104 may communicate a maximum value for a video streaming parameter for the video streaming session to either the user endpoint device 108, 110, 112, or 114 and/or to the server(s) 126. The video streaming parameter may comprise any one or more (e.g., combination of) the video streaming parameters discussed above. The user endpoint device 108, 110, 112, or 114 and/or the server(s) 126 may use the maximum value of the video streaming parameter in conjunction with a measured value of the video streaming parameter to guide selection of chunks to be downloaded. For a video file that is currently being played back, the maximum value of the video streaming parameter (in conjunction with the measured value of the video streaming parameter) may guide selection of the version and/or variant of a chunk to request. For a video file that is being prefetched, the maximum value (in conjunction with the measured value) may be used to guide the selection of which chunks to request, as well as which versions and/or variants of those chunks should be requested.

For any given video file, a plurality of versions of that video file may exist, where each version of the video file has been encoded using a different codec. For instance, each codec may be compatible with different hardware, software, network conditions, and/or the like that may be used for streaming video. Furthermore, each encoded version of the video file may be further organized into a plurality of variants, where each variant may further encode the video file using a different combination of resolutions and bitrates (e.g., different levels of video "quality"). Thus, for each chunk of a video file, there will exist multiple versions of that chunk comprising different combinations of codecs. For each version, there will further comprise multiple variants (e.g., candidate variants) of that chunk comprising different combinations of resolution and bitrate. Some codecs may consume greater bandwidth during download, or may require more space in a buffer to store, than other codecs. Furthermore, higher quality (e.g., resolution and/or bitrate) variants of a chunk generally consume more bandwidth during download, and require more space in a buffer to store, than lower quality chunks. Thus, the choice of version and variant for each chunk may affect a video streaming parameter, such as the throughput (both instantaneous and average), of the video streaming session. When the video streaming parameter is a maximum average throughput, and the value limits the maximum average throughput, the value may constrain the selection of which chunks to request. Example methods for streaming short-form video while constrained by a value for a video streaming parameter are discussed in further detail below in connection with FIGS. 2 and 3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
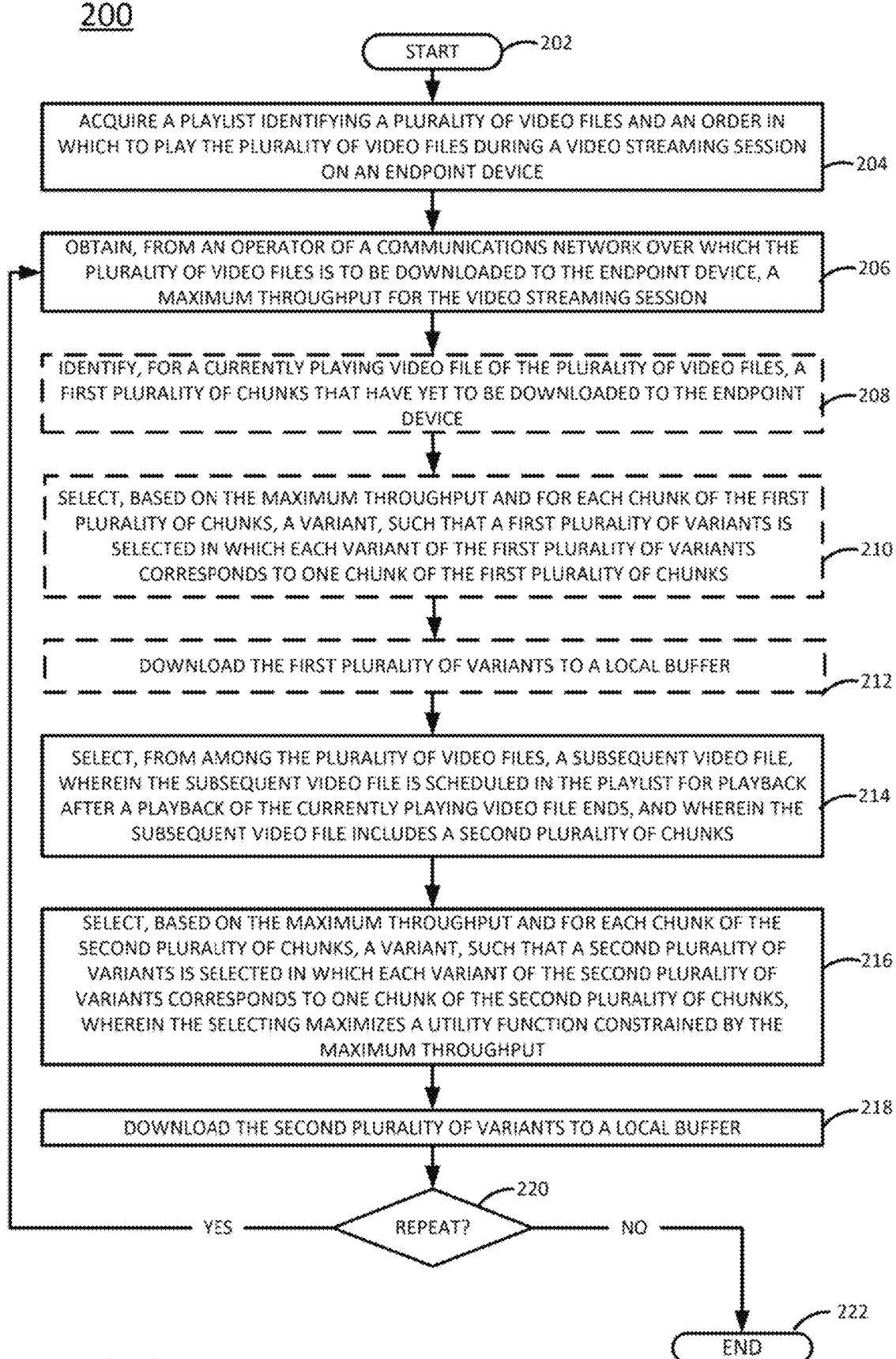
FIG. 2 illustrates a flowchart of an example method for streaming short-form video.

To further aid in understanding the present disclosure, FIG. 2 illustrates a flowchart of an example method 200 for streaming short-form video. In one example, the method 200 may be performed by one of the UEs 108-114 illustrated in FIG. 1. However, in other examples, the method 200 may be performed by another device, such as the computing system 400 of FIG. 4, discussed in further detail below. For the sake of discussion, the method 200 is described below as being performed by a processing system (where the processing system may comprise a component of a UE 108-114, the computing system 400, or another device). The method 200 may operate independently of other processes executed by the processing system or may operate in conjunction with other systems or processes that determine encoding bitrate requests or pacing in time of encoding bitrate requests for short-form video streaming. Moreover, as discussed in further detail below in connection with step 220 of the method 200, certain steps of the method 200 may be repeated for two or more iterations during a video streaming session.

The method 200 begins in step 202. In step 204, the processing system may acquire a playlist identifying a plurality of video files and an order in which the plurality of video files is to be played back during a video streaming session on an endpoint device.

In one example, the playlist may be served to the endpoint device of which the processing system is a part either automatically or in response to a request (e.g., from a user of the endpoint device).

In one example, each video file of the plurality of video files comprises a short-form video file. That is, each video file may comprise video content, where the video content may comprise a video clip having a relatively short (e.g., less than one minute) duration. The video content of the different video files may be separately filmed (e.g., at different times, at different locations, and/or by different video capture devices). However, in some cases, the video content of the different video files may share some commonality. For instance, the video content of the different video files may share a common theme (e.g., all videos of dogs), may all be uploaded by the same person or source (e.g., the same social media account), may all depict the same event (e.g., a particular baseball game), or the like.

In step 206, the processing system may obtain, from an operator of a communications network over which the plurality of video files is to be downloaded to the endpoint device, a maximum value of a streaming parameter for the video streaming session.

As discussed above, the video streaming parameter may comprise at least one of: a maximum allowed video resolution of the subsequent video file, a maximum allowed encoding bitrate of the subsequent video file, a maximum allowed average throughput over a duration of the video streaming session, a maximum allowed instantaneous throughput for the video streaming session, a maximum allowed file size per chunk of the second plurality of chunks, a maximum allowed file size of the subsequent video file, a maximum allowed data size per request for the endpoint device, a maximum allowed total data consumption for the video streaming session, or a maximum allowed total data consumption over a period of time during the video streaming session.

For instance, in one example, the video streaming parameter is an average throughput (i.e., average amount of data transferred by unit of time) for the video streaming session. In this case, the average throughput over the entire video streaming session should not exceed the value for the maximum average throughput (e.g., as obtained in step 206).

The maximum value of the video streaming parameter therefore imposes a data budget on the video streaming session. The magnitude of the maximum value may vary depending upon, for example, a subscription tier to which a user of the endpoint device is subscribed (e.g., where more expensive subscription tiers provide higher maximum values for video streaming parameters), a connectivity of a service plan with which the endpoint device is associated, current network conditions (e.g., traffic volume) in the network segment in which the endpoint device is operating, and/or other factors.

In one example, the maximum value of the video streaming parameter may be communicated from the operator of the communications network to the processing system through an application programming interface (API). The operator of the communications network may determine the maximum value of the video streaming parameter, or may be determined collaboratively by the operator of the communications network and an operator of a service that supports the video streaming session.

In optional step 208 (illustrated in phantom), the processing system may identify, for a currently playing video file of the plurality of video files, a first plurality of chunks that have yet to be downloaded to the endpoint device.

As discussed above, each video file may be streamed as a plurality of chunks, where each chunk contains a subset of the video frames making up the video file. The chunks may be downloaded one or more at a time, as allowed by the endpoint device's buffer space. That is, prior to playback of a video file, one or more of the first few chunks of the video file may be downloaded and stored in a buffer. After each chunk is played back, the chunk may be evicted from the buffer, making room for another chunk to be downloaded. This allows playback of a video file to begin, without requiring the entirety of the video file to be downloaded at the time that playback begins.

As discussed in further detail below, one or more chunks of another video file to be played later may be prefetched in the same manner, to minimize stalls between playback of separate video files (e.g., so that playback seamlessly proceeds from one video file to the next video file). It should also be noted that prefetched chunks associated with a later video file that the user elects to skip (i.e., will not be viewed) will be evicted from the buffer. However, in this case, the eviction of chunks of a skipped video may be considered as waste, since the chunks of the skipped video consumed space in the buffer that could have been used to store chunks of a video file that was not skipped.

Thus, as the currently playing video file is being played back on the endpoint device, there may be one or more chunks of the currently playing video file (i.e., the first plurality of chunks) that have yet to be downloaded and stored in the buffer. The processing system may identify these yet to be downloaded chunks, for instance by consulting a manifest file associated with the video file or playlist.

In optional step 210 (illustrated in phantom), the processing system may select, for each chunk of the first plurality of chunks, a variant, such that a first plurality of variants is selected in which each variant of the first plurality of variants corresponds to one chunk of the first plurality of chunks, wherein the selecting is based on both the maximum value and on a measured value for the video streaming parameter.

As discussed above, a video file may be encoded using multiple different codecs to create a plurality of versions of the video file. Each version of the video file may be further encoded into a plurality different variants exhibiting different combinations of resolution and bitrate. Thus, any given chunk of a given video file will belong to one variant of one version of the given video file. The choice of which variant to download for any given chunk may depend on multiple factors, including the maximum value for the video streaming parameter, the currently measured value for the video streaming parameter, and/or buffer constraints. For instance, some variants may require more bandwidth to download and/or more space to store. Selecting a chunk for download that requires a greater amount of bandwidth may push the average throughput (or other video streaming parameters) of the video streaming session past the maximum throughput. Moreover, it should be noted that although a maximum value for the video streaming parameter may be set, the actual measured value of the available video streaming parameter at any given time may be less than the maximum. For instance, the maximum value may provide a maximum average throughput. However, at a time of download, the actual available (e.g., measured) average throughput may be less than the maximum average throughput. Thus, the maximum value of the video streaming parameter limits or caps the video streaming parameter, but does not necessarily guarantee a quality or amount of the video streaming parameter that will be provided.

In optional step 212 (illustrated in phantom), the processing system may download the first plurality of variants to a local buffer of the endpoint device.

The first plurality of variants may be stored temporarily in the buffer. For instance, each variant of the first plurality of variants may be deleted once playback of the portion of the currently playing video file that corresponds to the variant concludes on the endpoint device. Alternatively, if the user of the endpoint device elects to skip over the portion of the currently playing video file that corresponds to a variant, then the variant may also be deleted.

In step 214, the processing system may select, from among the plurality of video files, a subsequent video file, wherein the subsequent video file is scheduled in the playlist for playback after a playback of the currently playing video file ends, and wherein the subsequent video file includes a second plurality of chunks.

As discussed above, the playlist may comprise a plurality of video files scheduled to be played in a predefined sequence. In one example, the plurality of video files may be played in the predefined sequence, without the possibility for alteration by the user (where alteration may include replaying a previously played video file, skipping ahead to a subsequent video file before a currently playing video file has completed playback, skipping a subsequent video file without beginning playback of the subsequent video file, changing an order in which one or more video files in the playlist are to be played, or other changes).

However, in other examples, the user may be able to replay video files that have already been played, skip video files that have been either partially played or not yet played, or change the order of video files in the playlist. In this case, the processing system may observe the user's behavior with regards to changes to the playlist. The processing system may use machine learning in order to learn user preferences, or in order to learn the relevance of video files to known or learned user preferences. For instance, the processing system may learn that the user often requests replay of videos that have dogs in them, but almost always skips over videos relating to a particular book series. Based on these user preferences, the processing system may determine that a first subsequent video file that is scheduled in the playlist for playback subsequent to the currently playing video file may be likely to be skipped by the user. In this case, the processing system may determine (e.g., based on analysis of metadata associated with the first subsequent video file) that chunks for the first subsequent video file should not be downloaded to the buffer of the endpoint device, as the chunks associated with the first subsequent video file are likely to be evicted from the buffer without being watched. Thus, the processing system may select an alternative (e.g., second) subsequent video file that is scheduled in the playlist for playback subsequent to the currently playing video file and whose content is a better match to the user's preferences.

In step 216, the processing system may select, for each chunk of the second plurality of chunks, a variant, such that a second plurality of variants is selected in which each variant of the second plurality of variants corresponds to one chunk of the second plurality of chunks, wherein the selecting is based on both the maximum value and the measured value for the video streaming parameter. In one example, the selecting the second plurality of variants maximizes a utility function.

As discussed above, each video file may be streamed as a plurality of chunks, where each chunk contains a subset of the video frames making up the video file. In one example, as the currently playing video file is being played back on the endpoint device, the processing system may attempt to prefetch chunks of one or more subsequent video files in order to minimize any stalls that might occur between end of playback of the currently playing video file and start of playback of the immediately subsequent video file. The processing system may identify the chunks of the one or more subsequent video files, for instance by consulting a manifest file associated with the video file or playlist.

In one example, selection of the second plurality of variants may be made in conjunction with selection of the second plurality of chunks. For instance, the number of chunks to be prefetched (i.e., the number of chunks in the second plurality of chunks) may depend at least in part on the desired resolution and bitrate of those chunks (which may be defined by a user preference, quality of experience targets, current network traffic conditions, and/or by capabilities of the endpoint device).

As discussed above, in one example, the selection of the second plurality of variants may seek to maximize a utility function. The utility function may be designed to maximize the encoding bitrate of the second plurality of variants, while also applying penalties according to a wastage rate caused by the deletion of variants that are downloaded, but deleted without being played back (as expressed in EQN. 1, below). The maximum value of the video streaming parameter may correspond to a maximum allowed network throughput (denoted as L below), which in turn function as a first constraint on the utility function by ensuring that data size of every variant to be downloaded is smaller than the total size of the data allowed by the maximum value of the video streaming parameter (as expressed in EQN. 2, below). Additional constraints on the utility function may seek to ensure that some data (e.g., at least one variant) is always contained in the buffer, so that stalls in playback may be prevented (as expressed in EQN. 3, below).

In one example, maximization of the utility function $u_t$ may be expressed as:

$$\max \sum_{t=1}^{T} u_t = \max \sum_{t=1}^{T} \left( \sum_{i \in \vec{m}_t} \sum_{j \in \vec{n}_{t,i}} r_{i,j} - \frac{W_t}{D_t} \right) \quad \text{(EQN. 1)}$$

such that $$\sum_{t=1}^{T} \sum_{i \in \vec{m}_t} \sum_{j \in \vec{n}_{t,i}} S_{i,j} < L \sum_{t=1}^{T} D_t \quad \text{(EQN. 2)}$$

and $$B_{i,t+1} = B_{i,t} - d_{i,t} - V_{i,t} + \sum_{j \in n_{t,i}} \frac{S_{i,j}}{r_{i,j}} > 0, \quad \text{(EQN. 3)}$$

$$\forall t \in \{1, \ldots, T\}$$

and $$\forall i \in \vec{m}_t$$

It should be noted that EQNs. 1-3 assume that certain steps of the method 200 will be periodically repeated, as discussed in greater detail below in connection with step 220. In one example, a total of T iterations of these steps is performed over the video streaming session.

In EQNs. 1-3, $\vec{m}_t$ is a sequence of video files m in a playlist M that have been downloaded during a $t^{th}$ iteration of the method 200 ($t \in T$); $\vec{n}_{t,i}$ is a sequence of (variants of) chunks n of $i^{th}$ video file in the sequence of video files ($i \in \vec{m}_t$); $r_{i,j}$ is the encoding bitrate of the $j^{th}$ chunk of the $i^{th}$ video file which is downloaded during iteration t of the method 200; $W_t$ is a total amount of data (measured in bytes) that was deleted from the buffer without being played back during the $t^{th}$ iteration of the method 200 and corresponds to wasted video $V_{i,t}$ (measured in seconds) for every video file in the sequence of video files; $d_{i,t}$ is the playout duration of each video file in the sequence of video files; $S_{i,j}$ is the data size (e.g., measured in bytes) of the $j^{th}$ chunk of the $i^{th}$ video downloaded during the $t^{th}$ iteration of the method 200; and $B_{i,t}$ is the instantaneous buffer allocated for the $i^{th}$ video file at the beginning of the $t^{th}$ iteration of the method 200; and $B_{i,t+1}$ is the instantaneous buffer allocated for the $i^{th}$ video file at the beginning of the $t+1^{th}$ iteration of the method 200. $D_t$ is the duration of the $t^{th}$ iteration of the method 200. In one example, the durations of the T iterations may be variable, such that two or more individual iterations within the T iterations may have different durations (e.g., iteration t may be shorter or longer than iteration t+1). In one example, the duration $D_t$ may be expressed as:

$$D_t = \sum_{i \in \vec{m}_t} d_{i,t}. \quad \text{(EQN. 4)}$$

In step 218, the processing system may download the second plurality of variants to the local buffer of the endpoint device.

In one example, the second plurality of variants may be downloaded to the local buffer simultaneously with the first video file being played back on the endpoint device. That is, while the first video file is being played back, the second plurality of variants may be downloaded at the same time.

Thus, as discussed above, the processing system may prefetch the subsequent video file by downloading the chunks of the subsequent video file before the currently playing video file has concluded playback. In one example, steps 214-218 may be performed for multiple subsequent video files simultaneously (e.g., so that at least a third plurality of variants for another subsequent video file is downloaded at the same time that the second plurality of variants is downloaded). The prefetching of multiple different video files at once is also referred to as parallel prefetching. In this case, the collective throughput for the download of the multiple subsequent video files may, at any given point in time, exceed the maximum value of the video streaming parameter (e.g., throughput); however, over the duration of the video streaming session (e.g., the video streaming session that is governed by the method 200), the average value of the video streaming parameter will not exceed the maximum value of the video streaming parameter.

The second plurality of variants may be stored temporarily in the buffer. For instance, each variant of the second plurality of variants may be deleted once playback of the portion of the subsequent video file to which the variant corresponds concludes on the endpoint device. Alternatively, if the user of the endpoint device elects to skip over the portion of the subsequent video file that corresponds to a variant, then the variant may also be deleted.

In step 220, the processing system may determine whether to repeat steps 206-218.

For instance, in one example, the processing system may periodically reassess the manner in which it downloads chunks for both the currently playing video file and any subsequent video files whose chunks are being prefetched. The determination as to how to partition the maximum value of the video streaming parameter among the currently streaming video file and the subsequent video files, as well as to which variants of the chunks of the currently playing video file and the subsequent video files to download, may change over the course of the video streaming session (e.g., as network conditions, user preferences, or quality of experience targets change). The maximum value of the video streaming parameter may also change over time in response to changing network conditions. Thus, throughout the video streaming session, the processing system may repeat one or more of steps 206-218 in order to adapt. Steps 206-218 may be repeated periodically (e.g., every x seconds, y minutes, or z video files). Steps 206-218 may also be repeated in response to the detection of a predefined event (e.g., a user requesting alterations to the playlist, the operator of the communications network reporting a change in the maximum value of the video streaming parameter, or another event).

If the processing system concludes in step 220 that steps 206-218 should be repeated, then the method 200 may return to step 206, and the processing system may proceed as discussed above by first obtaining a maximum value of the video streaming parameter (which may have changed since a last execution of the method 206).

If, however, the processing system concludes in step 220 that steps 206-218 should not be repeated (e.g., it is not yet time to repeat steps 206-218, or the video streaming session has ended), then the method 200 may end in step 222.

The method 200 therefore attempts to manage tradeoffs between the consumption of network resources needed to prefetch subsequent video files in a playlist and the consumption of network resources needed to stream a currently playing video file in the playlist. Different policies may manage these tradeoffs in different ways, where the different policies may be motivated by different user preferences, different quality of experience targets, different network conditions, and/or other factors. For instance, when network resources are limited (e.g., availability is below a predefined threshold), one policy might prioritize the quality of experience for the currently playing video file over prefetching of subsequent video files. In this case, the amount of the limited network resources that is allocated for prefetching the subsequent video files may be scaled back in favor of using those resources to enable the download of higher quality chunks (e.g., higher resolution and/or bitrate) for the currently playing video file. A different policy might split the maximum value of the video streaming parameter equally between the currently playing video file and the subsequent video files. In another example, a policy might be structured to result in, on average, equivalent traffic volume per video streaming session (e.g., by limiting the maximum bitrate that can be requested and deciding the timing for each download so that the maximum bitrate is not exceeded either in aggregate or on average over a plurality of video streaming sessions). Thus, the limits on video streaming parameters may be respected in a manner that partitions available network resources between the currently playing video file and subsequent video files.

Moreover, the method 200 provides a traffic management solution that is viable in spite of changes in traffic encryption methods and robust against misidentification of traffic type. Thus, network management on the operator side is simplified, while quality of experience for users is improved, and video streaming service providers are provided with greater flexibility for providing service to users.

Figure 3:
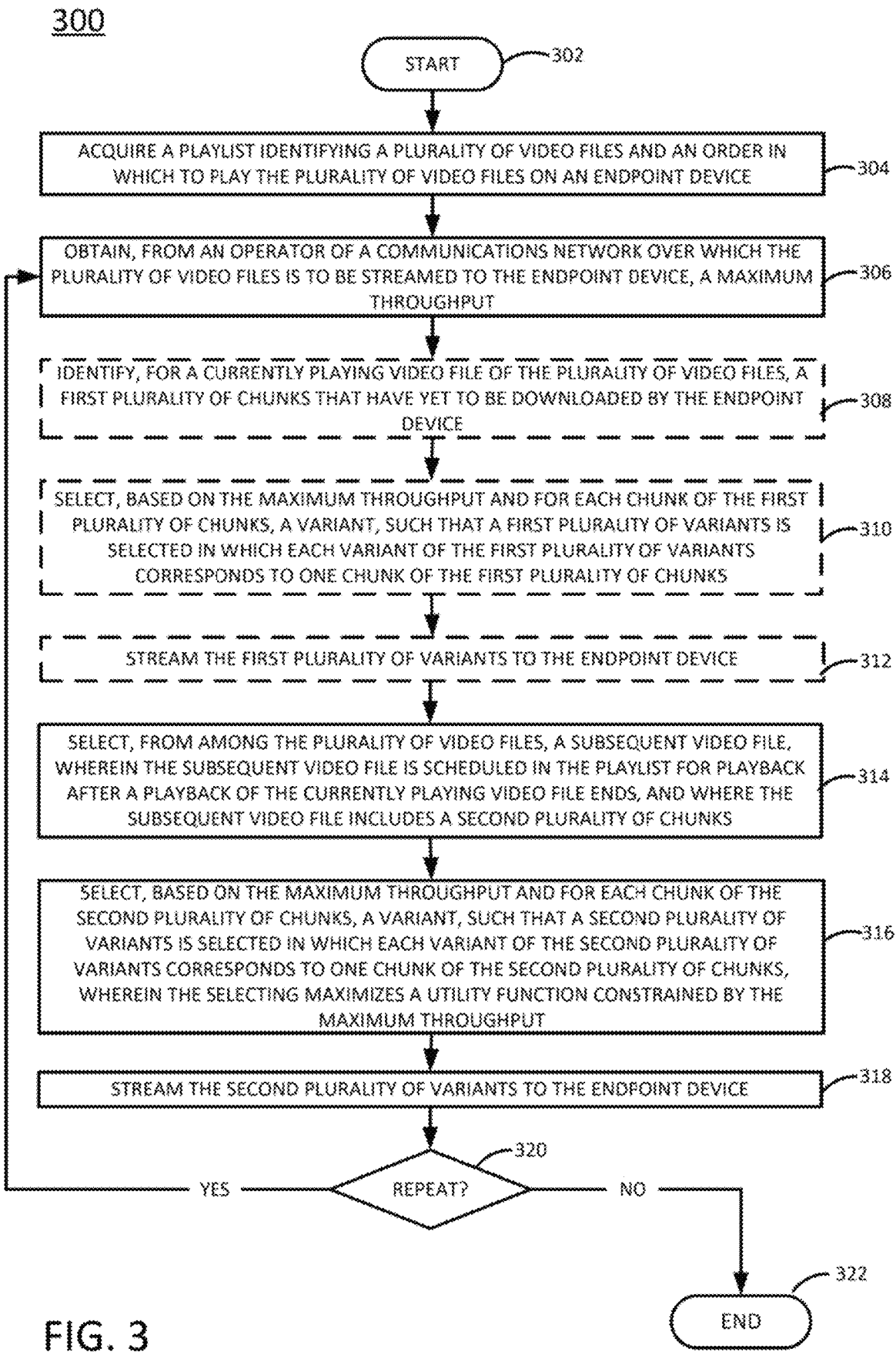
FIG. 3 illustrates a flowchart of an example method for streaming short-form video.

FIG. 3 illustrates a flowchart of an example method 300 for streaming short-form video. In one example, the method 300 may be performed by a network attached entity, such as one of servers 126 illustrated in FIG. 1. However, in other examples, the method 300 may be performed by another device, such as the computing system 400 of FIG. 4, discussed in further detail below. For the sake of discussion, the method 300 is described below as being performed by a processing system (where the processing system may comprise a component of a server, the computing system 400, or another device). The method 300 may operate independently of other processes executed by the processing system or may operate in conjunction with other systems or processes that determine encoding bitrate requests or pacing in time of encoding bitrate requests for short-form video streaming. Moreover, as discussed in further detail below in connection with step 320 of the method 300, certain steps of the method 300 may be repeated for two or more iterations during a video streaming session.

The method 300 begins in step 302. In step 304, the processing system may acquire a playlist identifying a plurality of video files and an order in which the plurality of video files is to be played back during a video streaming session on an endpoint device.

In one example, the playlist may be served to the server of which the processing system is a part either automatically or in response to a request (e.g., from a user of the endpoint device).

In one example, each video file of the plurality of video files comprises a short-form video file. That is, each video file may comprise video content, where the video content may comprise a video clip having a relatively short (e.g., less than one minute) duration. The video content of the different video files may be separately filmed (e.g., at different times, at different locations, and/or by different video capture devices). However, in some cases, the video content of the different video files may share some commonality. For instance, the video content of the different video files may share a common theme (e.g., all videos of dogs), may all be uploaded by the same person or source (e.g., the same social media account), may all depict the same event (e.g., a particular baseball game), or the like.

In step 306, the processing system may obtain, from an operator of a communications network over which the plurality of video files is to be streamed to the endpoint device, a maximum value of a video streaming parameter for the video streaming session.

As discussed above, the video streaming parameter may comprise at least one of: a maximum allowed video resolution of the subsequent video file, a maximum allowed encoding bitrate of the subsequent video file, a maximum allowed average throughput over a duration of the video streaming session, a maximum allowed instantaneous throughput for the video streaming session, a maximum allowed file size per chunk of the second plurality of chunks, a maximum allowed file size of the subsequent video file, a maximum allowed data size per request for the endpoint device, a maximum allowed total data consumption for the video streaming session, or a maximum allowed total data consumption over a period of time during the video streaming session.

In one example, the video streaming parameter is an average throughput (i.e., average amount of data transferred by unit of time) for the video streaming session. In this case, the average throughput over the entire video streaming session should not exceed a maximum average throughput as obtained in step 206 (i.e., as the maximum value of the video streaming parameter). The maximum average throughput therefore imposes a data budget on the video streaming session.

The magnitude of the maximum value of the video streaming parameter may vary depending upon, for example, a subscription tier to which a user of the endpoint device is subscribed (e.g., where more expensive subscription tiers provide higher maximum values for video streaming parameters), a connectivity of a service plan with which the endpoint device is associated, current network conditions (e.g., traffic volume) in the network segment in which the endpoint device is operating, and/or other factors.

In one example, the maximum value of the video streaming parameter may be communicated from the operator of the communications network to the processing system through an API. The operator of the communications network may determine the maximum value of the video streaming parameter, or may be determined collaboratively by the operator of the communications network and an operator of a service that supports the video streaming session (e.g., an operator or owner of the server of which the processing system is a part).

In optional step 308 (illustrated in phantom), the processing system may identify, for a currently playing video file of the plurality of video files, a first plurality of chunks that have yet to be downloaded by the endpoint device.

As discussed above, each video file may be streamed as a plurality of chunks, where each chunk contains a subset of the video frames making up the video file. The chunks may be downloaded one or more at a time, as allowed by the endpoint device's buffer space. That is, prior to playback of a video file, one or more of the first few chunks of the video file may be downloaded and stored in a buffer. After each chunk is played back, the chunk may be evicted from the buffer, making room for another chunk to be downloaded. This allows playback of a video file to begin, without requiring the entirety of the video file to be downloaded at the time that playback begins.

As discussed in further detail below, one or more chunks of another video file to be played later may be prefetched in the same manner, to minimize stalls between playback of separate video files (e.g., so that playback seamlessly proceeds from one video file to the next video file). It should also be noted that prefetched chunks associated with a later video file that the user elects to skip (i.e., will not be viewed) will be evicted from the buffer. However, in this case, the eviction of chunks of a skipped video may be considered as waste, since the chunks of the skipped video consumed space in the buffer that could have been used to store chunks of a video file that was not skipped.

Thus, as the currently playing video file is being played back on the endpoint device, there may be one or more chunks of the currently playing video file (i.e., the first plurality of chunks) that have yet to be downloaded and stored in the buffer. The processing system may identify these yet to be downloaded chunks, for instance by consulting a manifest file associated with the video file or playlist.

In optional step 310 (illustrated in phantom), the processing system may select, for each chunk of the first plurality of chunks, a variant, such that a first plurality of variants is selected in which each variant of the first plurality of variants corresponds to one chunk of the first plurality of chunks, wherein the selecting is based on the maximum value of the video streaming parameter and a measured value of the video streaming parameter.

As discussed above, a video file may be encoded using multiple different codecs to create a plurality of versions of the video file. Each version of the video file may be further encoded into a plurality of different variants exhibiting different combinations of resolution and bitrate. Thus, any given chunk of a given video file will belong to one variant of one version of the given video file. The choice of which variant to stream to the endpoint device for any given chunk may depend on multiple factors, including the maximum value of the video streaming parameter, the currently measured value of the video streaming parameter, and/or buffer constraints of the endpoint device. For instance, some variants may require more bandwidth to download and/or more space to store. Selecting a chunk for streaming that requires a greater amount of bandwidth may push the average video streaming parameter of the video streaming session past the maximum value.

In optional step 312 (illustrated in phantom), the processing system may stream the first plurality of variants to a local buffer of the endpoint device.

The endpoint device may store the first plurality of variants in the buffer temporarily. For instance, each variant of the first plurality of variants may be deleted once playback of the portion of the currently playing video file that corresponds to the variant concludes on the endpoint device. Alternatively, if the user of the endpoint device elects to skip over the portion of the currently playing video file that corresponds to a variant, then the variant may also be deleted.

In step 314, the processing system may select, from among the plurality of video files, a subsequent video file, wherein the subsequent video file is scheduled in the playlist for playback after a playback of the currently playing video file ends, and wherein the subsequent video file includes a second plurality of chunks.

As discussed above, the playlist may comprise a plurality of video files scheduled to be played in a predefined sequence. In one example, the plurality of video files may be played in the predefined sequence, without the possibility for alteration by the user (where alteration may include replaying a previously played video file, skipping ahead to a subsequent video file before a currently playing video file has completed playback, skipping a subsequent video file without beginning playback of the subsequent video file, changing an order in which one or more video files in the playlist are to be played, or other changes).

However, in other examples, the user may be able to replay video files that have already been played, skip video files that have been either partially played or not yet played, or change the order of video files in the playlist. In this case, the endpoint device may observe the user's behavior with regards to changes to the playlist. The endpoint device may use machine learning in order to learn user preferences, or in order to learn the relevance of video files to known or learned user preferences. For instance, the endpoint device may learn that the user often requests replay of videos that have dogs in them, but almost always skips over videos relating to a particular book series. Based on these user preferences, which may be communicated to the processing system by the endpoint device, the processing system may determine that a first subsequent video file that is scheduled in the playlist for playback subsequent to the currently playing video file may be likely to be skipped by the user. In this case, the processing system may determine (e.g., based on analysis of metadata associated with the first subsequent video file) that the first subsequent video file should not be streamed to the endpoint device, as the chunks associated with the first subsequent video file are likely to be evicted from the endpoint device's buffer without being watched. Thus, the processing system may select an alternative (e.g., second) subsequent video file that is scheduled in the playlist for playback subsequent to the currently playing video file and whose content is a better match to the user's preferences.

In step 316, the processing system may select, for each chunk of the second plurality of chunks, a variant, such that a second plurality of variants is selected in which each variant of the second plurality of variants corresponds to one chunk of the second plurality of chunks, wherein the selecting is based on the maximum value of the video streaming parameter and the measured value of the video streaming parameter. In one example, the selecting the second plurality of variants maximizes a utility function.

As discussed above, each video file may be streamed as a plurality of chunks, where each chunk contains a subset of the video frames making up the video file. In one example, as the currently playing video file is being played back on the endpoint device, the processing system may attempt to prefetch chunks of one or more subsequent video files in order to minimize any stalls that might occur between end of playback of the currently playing video file and start of playback of the immediately subsequent video file. The processing system may identify the chunks of the one or more subsequent video files, for instance by consulting a manifest file associated with the video file or playlist.

In one example, selection of the second plurality of chunks may be made in conjunction with selection of the second plurality of variants. For instance, the number of chunks to be prefetched (i.e., the number of chunks in the second plurality of chunks) may depend at least in part on the desired resolution and bitrate of those chunks (which may be defined by a user preference, quality of experience targets, current network traffic conditions, and/or by capabilities of the endpoint device).

In one example, the second plurality of variants may be selected to maximize a utility function $u_t$ in accordance with EQNs. 1-3, discussed above.

In step 318, the processing system may stream the second plurality of variants to the local buffer of the endpoint device.

Thus, as discussed above, the processing system may prefetch the subsequent video file by streaming the chunks of the subsequent video file before the currently playing video file has concluded playback. In one example, steps 314-318 may be performed for multiple subsequent video files simultaneously (i.e., parallel prefetching). In this case, the collective consumption of the video streaming parameter (e.g., throughput) for the streaming of the multiple subsequent video files may, at any given point in time, exceed the maximum value of the video streaming parameter; however, over the duration of the video streaming session (e.g., the video streaming session that is governed by the method 300), the average value of the video streaming parameter will not exceed the maximum value of the video streaming parameter.

The second plurality of variants may be stored temporarily in the buffer of the endpoint device. For instance, each variant of the second plurality of variants may be deleted once playback of the portion of the subsequent video file to which the variant corresponds concludes on the endpoint device. Alternatively, if the user of the endpoint device elects to skip over the portion of the subsequent video file that corresponds to a variant, then the variant may also be deleted.

In step 320, the processing system may determine whether to repeat steps 306-318.

For instance, in one example, the processing system may periodically reassess the manner in which it streams chunks for both the currently playing video file and any subsequent video files whose chunks are being prefetched. The determination as to how to partition the maximum value of the video streaming parameter among the currently streaming video file and the subsequent video files, as well as to which variants of the chunks of the currently playing video file and the subsequent video files to download, may change over the course of the video streaming session (e.g., as network conditions, user preferences, or quality of experience targets change). The magnitude of the maximum value of the video streaming parameter may also change over time in response to changing network conditions. Thus, throughout the video streaming session, the processing system may repeat one or more of steps 306-318 in order to adapt. Steps 306-318 may be repeated periodically (e.g., every x seconds, y minutes, or z video files). Steps 306-318 may also be repeated in response to the detection of a predefined event (e.g., a user requesting alterations to the playlist, the operator of the communications network reporting a change in the maximum value of the video streaming parameter, or another event).

If the processing system concludes in step 320 that steps 306-318 should be repeated, then the method 300 may return to step 306, and the processing system may proceed as discussed above by first obtaining a maximum value of the video streaming parameter (which may have changed since a last execution of the method 306).

If, however, the processing system concludes in step 320 that steps 306-318 should not be repeated (e.g., it is not yet time to repeat steps 306-318, or the video streaming session has ended), then the method 300 may end in step 322.

Although not expressly specified above, one or more steps of the method 200, or 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Moreover, it should be noted that when the terms "first," "second," "third," or the like are used herein to refer to items (such as a "video file," a "plurality of chunks," a "plurality of variants," or the like), these terms are meant only to differentiate between two or more different items of the same type. In other words, such terms are not meant to imply that a particular number of items exists or is required for operation of the present disclosure. Nor is a reference to a "second," "third," or the like item meant to imply that a "first," "second," or the like item exists or is required.

FIG. 4 depicts a high-level block diagram of a computing device specifically programmed to perform the functions described herein. For example, any one or more components or devices illustrated in FIG. 1 or described in connection with the methods 200 and 300 may be implemented as the system 400. For instance, one of the user endpoint devices 108, 110, 112, or 114 of FIG. 1 (such as might be used to perform the method 200) could be implemented as illustrated in FIG. 4. In another example, the any one or more of the servers 126 of FIG. 1 (such as might be used to perform the method 300) could be implemented as illustrated in FIG. 4.

As depicted in FIG. 4, the system 400 comprises a hardware processor element 402, a memory 404, a module 405 for streaming short-form video, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for streaming short-form video may include circuitry and/or logic for performing special purpose functions relating to estimating available bandwidth ranges and/or modifying settings for data transfers according to available bandwidth ranges. The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one specific-purpose computer is shown in the Figure, if the method (s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for streaming short-form video (e.g., a software program comprising computer-executable instructions) can be loaded into memory 404 and executed by hardware processor element 402 to implement the steps, functions or operations as discussed above in connection with the example methods 200, and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for streaming short-form video (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
acquiring, by a processing system including at least one processor, a playlist identifying a plurality of video files and an order in which the plurality of video files is to be played back during a video streaming session on an endpoint device;
obtaining, by the processing system from an operator of a communications network over which the plurality of video files is to be downloaded to the endpoint device, a maximum throughput for the video streaming session;
selecting, by the processing system from among the plurality of video files, a subsequent video file, wherein the subsequent video file is scheduled in the playlist for playback after a playback of a currently playing video file of the plurality of video files ends, and wherein the subsequent video file includes a second plurality of chunks;
selecting, by the processing system based on the maximum throughput and for each chunk of the second plurality of chunks, a variant, such that a second plurality of variants is selected in which each variant of the second plurality of variants corresponds to one chunk of the second plurality of chunks, wherein the selecting the second plurality of variants maximizes a utility function for the video streaming session, wherein the utility function maximizes an encoding bitrate of the second plurality of variants, and wherein the utility function is constrained by the maximum throughput; and
downloading, by the processing system, the second plurality of variants to a local buffer of the endpoint device, wherein the utility function further imposes a penalty based on a wastage rate that is caused by a deletion of previously downloaded variants from the local buffer, wherein the previously downloaded variants are deleted without being played back.

2. The method of claim 1, wherein the maximum throughput constrains the utility function by requiring that no variant in the second plurality of variants has a data size that exceeds a total size of data download allowed by the maximum throughput.

3. The method of claim 2, wherein the utility function is further constrained by a requirement for the local buffer to always contain at least one variant.

4. The method of claim 1, further comprising:
selecting, by the processing system from among the plurality of video files, another subsequent video file, wherein the another subsequent video file is scheduled in the playlist for playback after a playback of the subsequent video file ends, and wherein the another subsequent video file includes a third plurality of chunks;
selecting, by the processing system based on the maximum throughput and for each chunk of the third plurality of chunks, a variant, such that a third plurality of variants is selected in which each variant of the third plurality of variants corresponds to one chunk of the third plurality of chunks, wherein the selecting the third plurality of variants maximizes the utility function for the video streaming session; and downloading, by the processing system, the third plurality of variants to the local buffer of the endpoint device simultaneously with downloading the second plurality of variants.

5. The method of claim 1, wherein each video file of the plurality of video files has a duration of less than one minute.

6. The method of claim 1, wherein the maximum throughput comprises a maximum average throughout over a duration of the video streaming session.

7. The method of claim 6, wherein an instantaneous throughput at a given time in the duration of the video streaming session is permitted to exceed the maximum throughput, as long as an average throughput over the duration of the video streaming session does not exceed the maximum throughput.

8. The method of claim 1, wherein the maximum throughput varies over a duration of the video streaming session.

9. The method of claim 1, wherein each chunk of the second plurality of chunks contains a subset of a plurality of video frames making up the subsequent video file.

10. The method of claim 9, wherein each variant of the second plurality of variants is selected from among a plurality of candidate variants, and each candidate variant of the plurality of candidate variants comprises a version of the subsequent video file that is encoded with a different combination of codec, resolution, and bitrate.

11. The method of claim 10, wherein the selecting the second plurality of variants balances a number of the second plurality of chunks against the combination of codec, resolution, and bitrate such that the downloading avoids exceeding a maximum bitrate.

12. The method of claim 1, further comprising:
repeating, by the processing system, the obtaining, the selecting the subsequent video file, the selecting the second plurality of variants, and the downloading on a periodic basis.

13. The method of claim 1, further comprising:
identifying, by the processing system for the currently playing video file of the plurality of video files, a first plurality of chunks that have yet to be downloaded to the endpoint device;
selecting, by the processing system based on the maximum throughput and for each chunk of the first plurality of chunks, a variant, such that a first plurality of variants is selected in which each variant of the first plurality of variants corresponds to one chunk of the first plurality of chunks; and
downloading, by the processing system, the first plurality of variants to the local buffer of the endpoint device.

14. The method of claim 13, further comprising:
repeating, by the processing system, the identifying the first plurality of chunks, the selecting the first plurality of variants, and the downloading the first plurality of variants on a periodic basis.

15. The method of claim 13, wherein the selecting the first plurality of variants balances a number of the first plurality of chunks against a combination of codec, resolution, and bitrate of the first plurality of variants such that the downloading the first plurality of variants avoids exceeding a maximum bitrate.

16. The method of claim 13, wherein the processing system partitions the maximum throughput between the currently playing video file and the subsequent video file according to a predefined policy.

17. A non-transitory computer-readable medium storing instructions which, when executed by a processing system including at least one processor, cause the processing system to perform operations, the operations comprising:
acquiring a playlist identifying a plurality of video files and an order in which the plurality of video files is to be played back during a video streaming session on an endpoint device;
obtaining, from an operator of a communications network over which the plurality of video files is to be downloaded to the endpoint device, a maximum throughput for the video streaming session;
selecting, from among the plurality of video files, a subsequent video file, wherein the subsequent video file is scheduled in the playlist for playback after a playback of a currently playing video file of the plurality of video files ends, and wherein the subsequent video file includes a second plurality of chunks;
selecting, based on the maximum throughput and for each chunk of the second plurality of chunks, a variant, such that a second plurality of variants is selected in which each variant of the second plurality of variants corresponds to one chunk of the second plurality of chunks, wherein the selecting the second plurality of variants maximizes a utility function for the video streaming session, wherein the utility function maximizes an encoding bitrate of the second plurality of variants, and wherein the utility function is constrained by the maximum throughput; and
downloading the second plurality of variants to a local buffer of the endpoint device, wherein the utility function further imposes a penalty based on a wastage rate that is caused by a deletion of previously downloaded variants from the local buffer, wherein the previously downloaded variants are deleted without being played back.

18. The non-transitory computer-readable medium of claim 17, wherein the maximum throughput constrains the utility function by requiring that no variant in the second plurality of variants has a data size that exceeds a total size of data download allowed by the maximum throughput.

19. The non-transitory computer-readable medium of claim 17, wherein the utility function is further constrained by a requirement for the local buffer to always contain at least one variant.

20. A system comprising:
a processing system including at least one processor; and
a non-transitory computer-readable medium storing instructions which, when executed by the processing system, cause the processing system to perform operations, the operations comprising:
acquiring a playlist identifying a plurality of video files and an order in which the plurality of video files is to be played back during a video streaming session on an endpoint device;
obtaining, from an operator of a communications network over which the plurality of video files is to be downloaded to the endpoint device, a maximum throughput for the video streaming session;
selecting, from among the plurality of video files, a subsequent video file, wherein the subsequent video file is scheduled in the playlist for playback after a playback of a currently playing video file of the plurality of video files ends, and wherein the subsequent video file includes a second plurality of chunks;

selecting, based on the maximum throughput and for each chunk of the second plurality of chunks, a variant, such that a second plurality of variants is selected in which each variant of the second plurality of variants corresponds to one chunk of the second plurality of chunks, wherein the selecting the second plurality of variants maximizes a utility function for the video streaming session, wherein the utility function maximizes an encoding bitrate of the second plurality of variants, and wherein the utility function is constrained by the maximum throughput; and downloading the second plurality of variants to a local buffer of the endpoint device, wherein the utility function further imposes a penalty based on a wastage rate that is caused by a deletion of previously downloaded variants from the local buffer, wherein the previously downloaded variants are deleted without being played back.

\* \* \* \* \*